US012574770B2

(12) United States Patent
Venkatachari et al.

(10) Patent No.: US 12,574,770 B2
(45) Date of Patent: Mar. 10, 2026

(54) MEASUREMENT GAP MANAGEMENT

(71) Applicant: QUALCOMM Incorporated, San Diego, CA (US)

(72) Inventors: Harish Venkatachari, San Jose, CA (US); Gautham Jayaram, San Diego, CA (US); Udayan Bhawnani, San Diego, CA (US); Vishu Kumar, Bengaluru (IN); Srinidhi Nagaraja, Bengaluru (IN); Rajendra Billure, Bangalore (IN); Ramesh Rajendra Kamath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 18/259,224

(22) PCT Filed: Jan. 27, 2022

(86) PCT No.: PCT/US2022/070387
§ 371 (c)(1),
(2) Date: Jun. 23, 2023

(87) PCT Pub. No.: WO2022/183156
PCT Pub. Date: Sep. 1, 2022

(65) Prior Publication Data
US 2024/0056849 A1     Feb. 15, 2024

(30) Foreign Application Priority Data

Feb. 27, 2021    (IN) ............................. 202141008306

(51) Int. Cl.
*H04W 24/08*        (2009.01)
(52) U.S. Cl.
CPC .................................. *H04W 24/08* (2013.01)

(58) Field of Classification Search
CPC ..... H04W 24/02; H04W 24/08; H04W 24/10; H04W 72/23
See application file for complete search history.

(56) References Cited

U.S. PATENT DOCUMENTS

2019/0021017 A1     1/2019  Nagaraja et al.

FOREIGN PATENT DOCUMENTS

EP         2485523 A1     8/2012
EP         2823671 B1     7/2020

OTHER PUBLICATIONS

Alcatel-Lucent: "Further Discussion on Relaxed Performance Requirement for HetNet", 3GPP TSG-RAN WG4 Meeting #70, R4-140643, Further Discussion on Relaxed Measurement Requirements for Hetnet, 3GPP, Mobile Competence Centre, 650, Route Des Lucioles, F-06921 Sophia-Antipolis Cedex, France, vol. RAN WG4, No. Prague, CZ, Feb. 10, 2014-Feb. 14, 2014, Feb. 9, 2014, XP050740339, 4 Pages, URL: http://www.3gpp.org/ftp/Meetings_3GPP_SYNC/RAN/RAN4/Docs/.

(Continued)

*Primary Examiner* — Sam Bhattacharya
(74) *Attorney, Agent, or Firm* — Patterson & Sheridan, L.L.P.

(57) ABSTRACT

A wireless communication device is described. The wireless communication device includes a processor. The wireless communication device also includes memory in electronic communication with the processor. The wireless communication device further includes instructions stored in the memory. The instructions are executable to determine, for a first measurement gap, whether a measured gain state matches an appointed gain state. The instructions are also executable to determine, for the first measurement gap, whether a new cell is detected. The instructions are further executable to determine whether to skip a subsequent measurement gap based on whether the measured gain state (Continued)

300

302 — Determine, for a first measurement gap, whether a measured gain state matches an appointed gain state 304 — Determine, for the first measurement gap, whether a new cell is detected 306 — Determine whether to skip a subsequent measurement gap based on whether the measured gain state matches the appointed gain state and whether a new cell is detected matches the appointed gain state and whether a new cell is detected.

20 Claims, 10 Drawing Sheets

(56) References Cited

OTHER PUBLICATIONS

International Search Report and Written Opinion—PCT/US2022/070387—ISA/EPO—Jun. 22, 2022.

302 — Determine, for a first measurement gap, whether a measured gain state matches an appointed gain state 304 — Determine, for the first measurement gap, whether a new cell is detected 306 — Determine whether to skip a subsequent measurement gap based on whether the measured gain state matches the appointed gain state and whether a new cell is detected

300

MEASUREMENT GAP MANAGEMENT

CROSS-REFERENCE TO RELATED APPLICATIONS

This application is a national stage application under 35 U.S.C. 371 of PCT/US2022/070387, filed Jan. 27, 2022, which claims benefit of and priority to Indian Provisional Application No. 20/214,1008306, filed Feb. 27, 2021, which are hereby expressly incorporated by reference herein in their entireties as if fully set forth below and for all applicable purposes.

FIELD OF DISCLOSURE

The present disclosure relates generally to electronic devices. More specifically, the present disclosure relates to measurement gap management.

BACKGROUND

In the last several decades, the use of electronic devices has expanded. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently, or with higher quality are often sought after.

Some electronic devices (e.g., cellular phones, smartphones, laptop computers, etc.) communicate with other electronic devices. For example, electronic devices may transmit and/or receive radio frequency (RF) signals to communicate.

SUMMARY

A wireless communication device is described. The wireless communication device includes a processor. The wireless communication device also includes a memory in electronic communication with the processor. The wireless communication device further includes instructions stored in the memory. The instructions are executable to determine, for a first measurement gap, whether a measured gain state matches an appointed gain state. The instructions are also executable to determine, for the first measurement gap, whether a new cell is detected. The instructions are further executable to determine whether to skip a subsequent measurement gap based on whether the measured gain state matches the appointed gain state and whether a new cell is detected.

The instructions may be executable to schedule the subsequent measurement gap in response to determining that the measured gain state does not match the appointed gain state or that a new cell is detected. The instructions may be executable to skip the subsequent measurement gap in response to determining that the measured gain state matches the appointed gain state and that a new cell is not detected. The subsequent measurement gap may be a second measurement gap. The instructions may be executable to skip a third measurement gap in response to determining that the measured gain state matches the appointed gain state and that a new cell is not detected.

The instructions may be executable to determine whether only a Long-Term Evolution (LTE)-to-LTE measurement is configured and whether a serving cell reference signal received power (RSRP) threshold is satisfied. The instructions may be executable to reschedule a measurement calculation corresponding to the first measurement gap to a subsequent periodic measurement gap in response to determining that only the LTE-to-LTE measurement is configured and that the serving cell RSRP threshold is satisfied.

The instructions may be executable to determine whether the measured gain state is an overlapping gain state with the appointed gain state and whether a reference signal received power (RSRP) satisfies a threshold. The instructions may be executable to skip the subsequent measurement gap in response to determining that the measured gain state is an overlapping gain state, that the RSRP satisfies the threshold, and that no new cell is detected. The subsequent measurement gap may be a second measurement gap. The instructions may be executable to skip scheduling a third measurement gap in response to determining that the measured gain state is an overlapping gain state, that the RSRP satisfies the threshold, and that no new cell is detected. Multiple channels may be configured for measurement.

A method is also described. The method includes determining, for a first measurement gap, whether a measured gain state matches an appointed gain state. The method also includes determining, for the first measurement gap, whether a new cell is detected. The method further describes determining whether to skip a subsequent measurement gap based on whether the measured gain state matches the appointed gain state and whether a new cell is detected.

A non-transitory tangible computer-readable medium storing computer-executable code is also described. The computer-readable medium includes code for causing a processor to determine, for a first measurement gap, whether a measured gain state matches an appointed gain state. The computer-readable medium also includes code for causing the processor to determine, for the first measurement gap, whether a new cell is detected. The computer-readable medium further includes code for causing the processor to determine whether to skip a subsequent measurement gap based on whether the measured gain state matches the appointed gain state and whether a new cell is detected.

An apparatus is also described. The apparatus includes means for determining, for a first measurement gap, whether a measured gain state matches an appointed gain state. The apparatus also includes means for determining, for the first measurement gap, whether a new cell is detected. The apparatus further includes means for determining whether to skip a subsequent measurement gap based on whether the measured gain state matches the appointed gain state and whether a new cell is detected.

DETAILED DESCRIPTION

Figure 1:
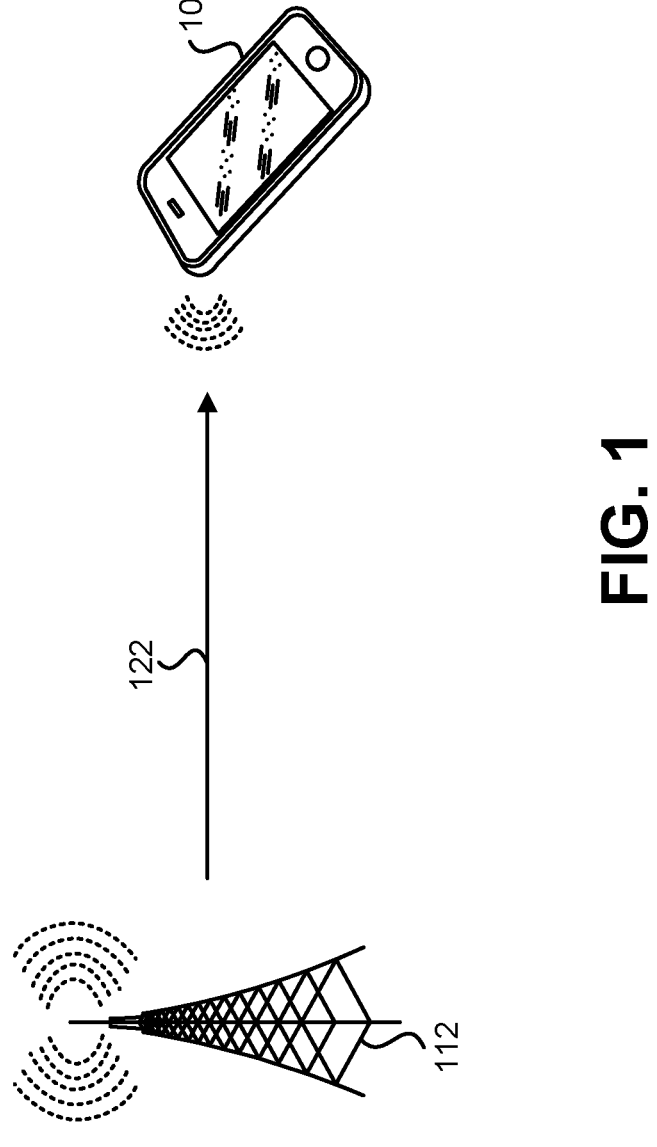
FIG. 1 is a diagram illustrating an example of a wireless communication device in which examples of measurement gap management may be implemented.

Some examples of the systems and methods disclosed herein relate to measurement gap management. For instance, some of the techniques described herein may enable conserving power and/or reducing latency during inter-frequency and/or inter-radio access technology (RAT) mobility procedures.

A wireless communication device is an electronic device that may communicate with another device or devices using radio frequency (RF) signals. Examples of the wireless communication devices include smartphones, tablet devices, laptop computers, mobile devices, vehicles, autonomous vehicles, user equipments (UEs), telematics units, embedded devices, etc. A base station is an electronic device that may communicate with one or more wireless communication devices. In some examples, a base station may provide wireless communication devices with access to a network (e.g., cellular network, local area network (LAN), wide area network (WAN), the Internet, etc.). In some examples, a wireless communication device (e.g., UE, embedded device, telematics unit, mobile device, etc.) and/or base station (e.g., Node B, evolved Node B (eNB), g Node B (gNB), etc.) may execute and/or utilize various radio technologies like Global System for Mobile Communication (GSM), third-generation wireless (3G) (e.g., Universal Mobile Telecommunications System (UMTS), Code Division Multiple Access 2000 (CDMA2000), Wideband Code Division Multiple Access (WCDMA), etc.), fourth-generation wireless (4G) (e.g., Long Term Evolution (LTE), etc.), and/or fifth-generation wireless (5G) (e.g., New Radio (NR), etc.).

In some cases, search and measurement procedures for inter-frequency and inter-RAT mobility in LTE may lead to high power consumption (e.g., high battery power loss) in connected discontinuous reception (DRx) mode and/or Idle DRx mode. For example, in 1 component carrier (1CC) voice over LTE (VoLTE) calls, the network (e.g., base station) could configure the UE with 3-5 bands (e.g., multiple Evolved Universal Terrestrial Radio Access (E-UTRA) absolute radio frequency channel numbers (EARFCNs)) for measurement and/or search. For some examples of a VoLTE call, this configuration may result in a relatively large power drag as compared to, e.g., a 1CC VoLTE configuration with no other inter-frequency measurements. Accordingly, testing may provide inaccurate results in representing field performance for power.

For some cases of automatic neighbor relations (ANR) and/or self-organizing network (SON) configurations, a UE may not directly derive a benefit by measuring, searching, and/or reporting for neighbor cells and/or bands. However, a UE may incur a relatively large penalty in terms of power to support ANR and/or SON in some cases.

In some cases, obtaining measurements with increased accuracy and/or searching may result in increased latencies. For instance, some cases of reselections and/or handoff may lead to relatively high latencies. In another example, while performing voice over NR (VoNR) Evolved Packet System (EPS) fallback (EPSFB) NR-to-LTE scheduling, there may be a limited timeframe to detect new LTE cells, prune ghost cells, and/or measure target LTE reference signal received power (RSRP) and/or reference signal received quality (RSRQ) metrics accurately.

In some approaches, multiple gaps and/or scheduling instances may be used for each EARFCN to be searched and/or measured. Each instance may consume power. For example, to complete a set of measurements and/or search, a UE may ensure automatic gain control (AGC) settling and may confirm newly detected cells. Each of these operations may utilize multiple scheduling instances to complete in some approaches. Some of the techniques described herein may provide beneficial inter-frequency and/or inter-RAT procedures (e.g., X-to-LTE scheduling) that may address one or more of the aforementioned issues. Some examples of the techniques described herein may reduce the number of gaps used to execute measurement and/or search procedures. In some examples, additional scheduling may be skipped (for sample collection, determining RF power, search and/or measurement, for instance) if the AGC state in which samples were collected is the same as an appointed (e.g., target, anticipated, etc.) AGC state based on measurements from the samples and if there are no new cells detected (relative to a previous period of measurement and/or search, for instance).

Various configurations are now described with reference to the Figures, where like reference numbers may or may not indicate functionally similar elements. The systems and methods as generally described and illustrated in the Figures herein could be arranged and designed in a wide variety of different configurations. Thus, the following more detailed description of several configurations, as represented in the Figures, is not intended to limit scope, but is merely representative of the systems and methods.

FIG. 1 is a diagram illustrating an example of a wireless communication device 102 in which examples of measurement gap management may be implemented. The wireless communication device 102 may be an example of the wireless communication device 202 described in relation to FIG. 2. A base station 112 is also illustrated in FIG. 1. The base station 112 may be a radio access network (RAN) or may be included in a RAN. In this example, the wireless communication device 102 communicates with the base station 112. For instance, the base station 112 sends one or more signals to the wireless communication device 102 over one or more channels 122. For example, the base station 112 may provide one or more cells for communication with the wireless communication device 102.

The wireless communication device 102 may search for signals from one or more other base stations and/or cells (not shown in FIG. 1). For instance, one or more measurement gaps may be utilized to allow the wireless communication device 102 to search for one or more other base stations and/or cells. A measurement gap may be a period of time in which a wireless communication device may attempt to detect and/or measure signals from one or more base stations and/or cells. Examples of times for a measurement gap may include 1 millisecond (ms), 2 ms, 4 ms, 5 ms, 6 ms, 10 ms, and/or in a range of 1-20 ms, etc. For instance, the measurement gap may be an over the air (OTA) gap. For instance, the wireless communication device 102 and the base station 112 may be approximately synchronized (e.g., in sync) for the OTA gap. The base station 112 may abstain from sending one or more signals to the wireless communication device 102 during one or more measurement gaps (which may free up the wireless communication device 102 to perform measurements, for instance). In some examples, a group of measurement gaps may be configured. For instance, a series of three measurement gaps may be configured. One or more measurement gaps may be configured to occur repeatedly (e.g., periodically). For instance, a measurement gap (or a group of measurement gaps) may periodically repeat with a period of 20 ms, 30 ms, 40 ms, 80 ms, in a range of 5-100 ms, etc.

The wireless communication device 102 may utilize one or more measurement gaps to search for one or more signals from one or more cells, to perform automatic gain control (AGC) for one or more signals from one or more cells, and/or to calculate measurements of one or more signals from one or more cells. Searching for one or more signals may include tuning one or more radio components to one or more frequency ranges and/or capturing signal samples in accordance with one or more tunings. Performing AGC may include adjusting gain (e.g., one or more low-noise amplifiers (LNAs)) to one or more gains (e.g., gain states) and/or capturing signal samples in accordance with one or more gains. Calculating measurements may include calculating one or more metrics (e.g., RSRP, RSRQ, and/or received signal strength (e.g., received signal strength indicator (RSSI)), etc.) corresponding to one or more signals.

In some approaches, a group of measurement gaps may be used for searching and/or measurement. For instance, a wireless communication device could take samples from a group of measurement gaps and average resulting measurements. In an example of LTE-to-LTE scheduling design, for a series of three measurement gaps (e.g., for each EARFCN 3+1 gaps allocated with AGC), search and measurements may be scheduled. A rationale for using a series of multiple measurement gaps may be that multiple gaps may be utilized for AGC settling and pruning ghost cells. Using all (e.g., all 3) of the measurement gaps may consume power (e.g., battery) and/or processing resources unnecessarily in some cases. For instance, a wireless communication device may enter and/or maintain a waking state (e.g., an awake state) during the measurement gaps, which may result in resource consumption. In some cases, using all of the measurement gaps (e.g., all measurement gaps in a group of measurement gaps and/or all measurement gaps for each period) may lead to relatively high latencies.

In some examples of the techniques described herein, the wireless communication device 102 may determine whether to skip one or more measurement gaps. Skipping a measurement gap may include not utilizing the measurement gap. For instance, the wireless communication device 102 may skip a measurement gap by abstaining from performing searching, by abstaining from performing AGC, by abstaining from performing measurement calculations, and/or by entering a sleep state within a time corresponding to the measurement gap. The wireless communication device 102 may determine cases where one or more measurement gaps may be skipped. For instance, the wireless communication device 102 may skip one or more measurement gaps when a measured gain state is the same as an appointed (e.g., target, expected, etc.) gain state and when no new cell is detected. Some examples may utilize another criterion or criteria to determine whether to skip a measurement gap or measurement gaps.

Figure 2:
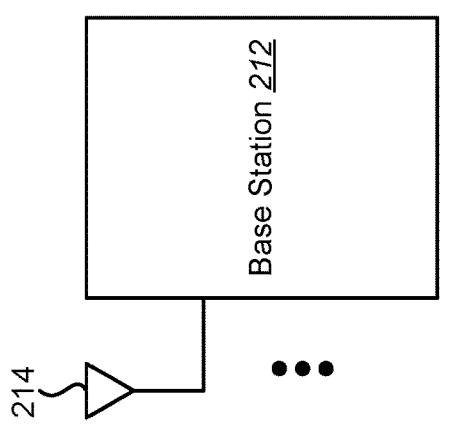
FIG. 2 is a block diagram illustrating an example of a wireless communication device in which techniques for measurement gap management may be implemented.
Figure 2:
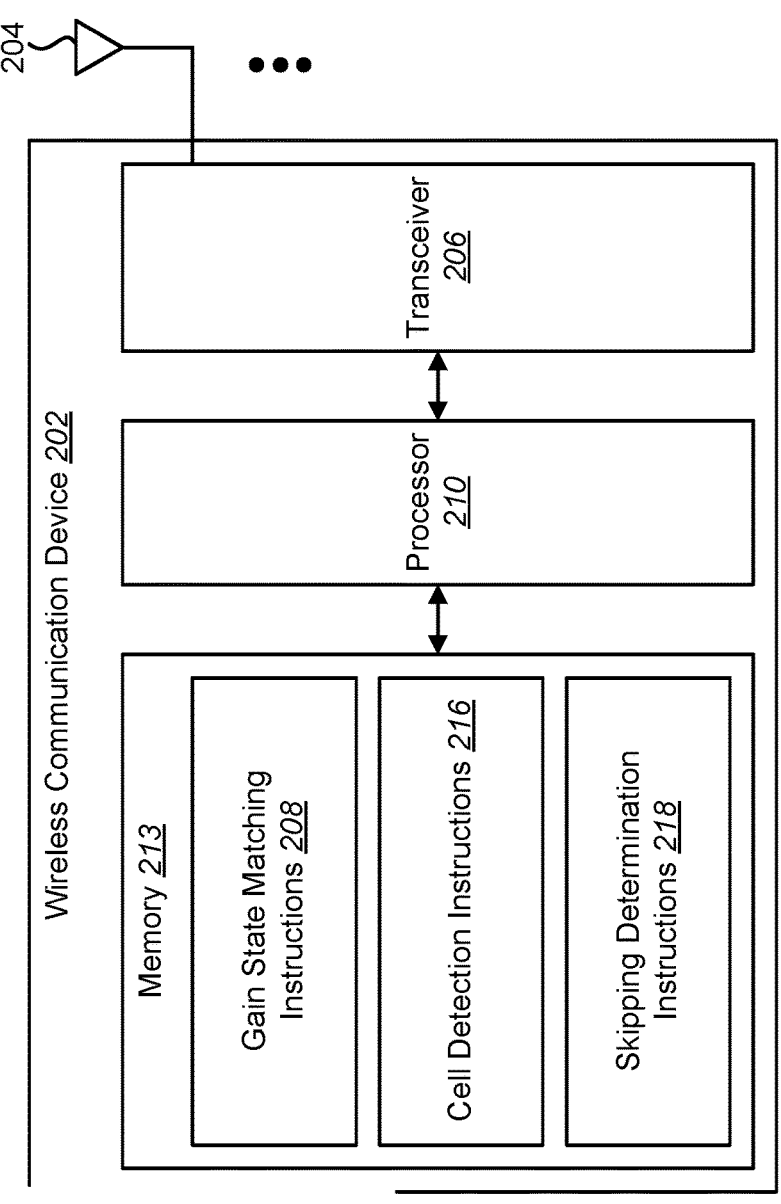

FIG. 2 is a block diagram illustrating an example of a wireless communication device 202 in which techniques for measurement gap management may be implemented. The wireless communication device 202 is a device or apparatus for transmitting and/or receiving RF signals. Examples of the wireless communication device 202 include UEs, smartphones, tablet devices, computing devices, computers (e.g., desktop computers, laptop computers, etc.), televisions, cameras, virtual reality devices (e.g., headsets), telematics units, embedded devices (e.g., telematics unit embedded in a vehicle), vehicles (e.g., semi-autonomous vehicles, autonomous vehicles, etc.), robots, aircraft, drones, unmanned aerial vehicles (UAVs), healthcare equipment, gaming consoles, Internet of Things (IoT) devices, etc. The wireless communication device 202 may perform one or more functions. One or more of the functions may be implemented in hardware (e.g., circuitry) or a combination of hardware and instructions (e.g., a processor with software and/or firmware stored in memory).

In some examples, the wireless communication device 202 includes one or more antennas 204 (e.g., 1, 2, 3, 4, etc., antennas), a transceiver 206, a processor 210, and/or memory 213. In some examples, the wireless communication device 202 includes one or more components and/or elements that are not shown in FIG. 2. For example, the wireless communication device 202 may include an RF front end (RFE), switch(es), filter(s), power amplifier(s), down-converter(s), upconverter(s), memory, and/or display (e.g., touchscreen), etc.

The transceiver 206 may be configured to send one or more signals to one or more other devices (e.g., base station 212) and/or to receive one or more signals from one or more other devices (e.g., base station 212). For example, a base station 212 may utilize one or more antennas 214 to transmit one or more signals to the wireless communication device 202 and/or to receive one or more signals from the wireless communication device 202. The transceiver 206 may include a transmitter (to send signal(s), for example) and/or a receiver (to receive signal(s), for example). In some examples, the transceiver 206 may be coupled to the antenna(s) 204 for transmitting and/or receiving signals. The transceiver 206 may be circuitry configured to perform one or more functions. For example, the transceiver 206 may include one or more integrated circuits with circuit components (e.g., transistors, resistors, capacitors, etc.). For instance, the transceiver 206 may include one or more power amplifiers, switches (for antenna port switching, for instance), filters, low-noise amplifiers, etc. The antenna(s) 204 may radiate one or more signals (e.g., electromagnetic signals, RF signals, wireless signals, etc.) provided by the transceiver 206. In some examples, the antenna(s) 204 may be utilized to receive one or more signals (e.g., configuration signals) from another device or devices (e.g., base station 212). For instance, the antenna(s) 204 may provide received signals to the transceiver 206 of the wireless communication device 202.

The processor 210 may be hardware (e.g., circuitry, transistors, etc.) for performing one or more operations. In some examples, the processor 210 may be one or more modems (e.g., modem processors) for performing operations (e.g., scheduling, AGC, sampling, measurement calculation, modulation, encoding, precoding, formatting, demodulation, and/or decoding, etc.). For instance, the processor 210 may perform one or more operations on one or more received signals provided by the transceiver 206 (e.g., a receiver of the transceiver 206). For example, the processor 210 may perform demodulation, detection, decoding, etc., and/or may convert the signal(s) or portions of the signal(s) into data (e.g., bits). In some examples, the processor 210 may control one or more aspects of transceiver 206 operation. For instance, the processor 210 may control tuning (e.g., frequency tuning), gain (e.g., gain state selection, LNA gain, etc.), antenna selection, and/or antenna weighting, etc., to enable signal transmission and/or reception.

The wireless communication device 202 may include memory 213. The memory 213 may be any electronic component capable of storing electronic information. The memory 213 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof. The memory 213 may be in electronic communication with the processor 210. In some examples, the memory 213 may include gain state matching instructions 208, cell detection instructions 216, and/or skipping determination instructions 218.

In some examples, the processor 210 executes instructions to perform the one or more functions. In some examples, the processor 210 includes one or more functionalities that are structurally implemented as hardware (e.g., circuitry). In some examples, the processor 210 includes a baseband processor, a modem processor, an application processor, and/or any combination thereof. In some examples, the wireless communication device 202 and/or the processor 210 may be configured to perform one or more of the methods 300, 400, 600, 800 and/or one or more portions of method(s), function(s), and/or operation(s) described in relation to one or more of the Figures. In some examples, the wireless communication device 202 and/or processor 210 includes and/or implements one or more of the structures, components, functions, operations, and/or elements described in relation to one or more of the Figures.

The base station 212 may be a device or apparatus for transmitting and/or receiving RF signals. Examples of the base station 212 include Node Bs, eNBs, gNBs, cellular towers, access points, gateways, wireless routers, etc. The base station 212 includes one or more components or elements. One or more of the components or elements may be implemented in hardware (e.g., circuitry) or a combination of hardware and instructions (e.g., a processor with software and/or firmware stored in memory). For instance, the base station 212 includes one or more antennas 214 (e.g., 1, 2, 3, 4, etc., antennas), transceivers (not shown in FIG. 2), processors (not shown in FIG. 2), and/or memories with instructions that are executable by the processor(s). In some examples, the base station 212 may include one or more other components and/or elements (e.g., RF front end (RFE), switch(es), filter(s), power amplifier(s), downconverter(s), upconverter(s), memory, and/or display, etc.). The base station 212 may be configured to send one or more signals to one or more other devices (e.g., wireless communication device 202 and/or one or more other wireless communication devices) and/or to receive one or more signals from one or more other devices (e.g., wireless communication device 202 and/or one or more other wireless communication devices). For example, a base station 212 may utilize one or more antennas 214 to transmit one or more signals to the wireless communication device 202 and/or to receive one or more signals from the wireless communication device 202. In some examples, the base station 212 may abstain from transmitting one or more signals to the wireless communication device 202 during one or more measurement gaps. For instance, the measurement gap(s) (e.g., measurement gap timing, duration, number, and/or periodicity, etc.) may be preconfigured and/or may be set up (e.g., negotiated) between the wireless communication device 202 and/or base station 212.

In some examples, the wireless communication device 202 and/or base station 212 may implement one or more aspects of one or more specifications (e.g., 3rd Generation Partnership Project (3GPP) Release 25, 3GPP Release 26, fifth generation (5G), New Radio (NR), Long-Term Evolution (LTE), Institute of Electrical and Electronics Engineers (IEEE) 802.11, and/or Bluetooth, etc.). For instance, reference may be made to "LTE-to-LTE," "NR-to-LTE," and/or "X-to-LTE," etc., where "X" may denote any radio access technology and/or specification. These references may refer to one or more cells and/or base stations that implement some or all aspects of the corresponding specifications. For instance, "LTE-to-LTE" may refer to a situation in which the wireless communication device 202 is getting service from an LTE cell and is searching for (and/or is configured to search for) one or more other LTE cells, "NR-to-LTE" may refer to a situation in which the wireless communication device 202 is getting service from an NR cell and is searching for (and/or is configured to search for) one or more LTE cells. In some examples, multiple channels (e.g., EARFCNs) may be configured for measurement.

The processor 210 may execute one or more instructions stored in the memory 213 to perform one or more functions. For instance, one or more instructions stored in the memory 213 may be executable (e.g., executable instructions and/or code).

In some examples, the processor 210 may execute the gain state matching instructions 208 to determine, for a measurement gap, whether a measured gain state matches an appointed gain state. For instance, during a first measurement gap, the wireless communication device may perform AGC to determine a measured gain state. In some examples, the measured gain state may be determined based on RSSI (e.g., broadband RSSI). A gain state may be a gain setting for the transceiver 206. For instance, a gain state may be applied to one or more LNAs (e.g., to activate or deactivate one or more LNAs and/or to adjust LNA gains, etc.) in the transceiver 206 to produce one or more gain magnitudes (e.g., a range of gain magnitudes). In some examples, the processor 210 may control and/or the transceiver 206 may be capable of applying multiple gain states (e.g., one of a set of gain states). For instance, a wireless communication device 202 may be capable of applying gain states denoted GS0, GS1, GS2, GS3, etc., where each gain state covers different RSRP ranges. In some examples, different gain states may have overlapping RSRP ranges. In some examples, GS2 and GS3 may be capable of measuring signals whose RSRP is in the range −115 dBm to −50 dBm and between −105 dBm to −45 dBm, respectively. In some examples, GS1 may be capable of measuring signals within the RSRP range of −120 dBm and −60 dBm, and GS0 may be capable of measuring signals whose RSRP levels are less than −75 dBm. Other RSRP ranges may be utilized in other examples.

An appointed gain state may be a target gain state, default gain state, assumed gain state, predicted gain state, and/or established gain state. For instance, the appointed gain state (for a measurement gap, for instance) may be preconfigured, set by a user, and/or determined based on previously determined gain states (e.g., a first appointed gain state may be selected as a most frequently measured gain state and/or most probable gain state). In some examples, the processor 210 may determine, for a measurement gap, whether the measured gain state matches the appointed gain state by comparing the measured gain state to the appointed gain state.

In some examples, the processor 210 may execute the cell detection instructions 216 to determine, for a measurement gap, whether a new cell is detected. A new cell may be a cell that is not in a current record of one or more cells. For instance, the wireless communication device 202 may maintain a record of one or more cells (e.g., serving cell(s), neighboring cell(s), etc.). During a first measurement gap, for example, the wireless communication device 202 (e.g., processor 210) may perform a search for one or more cells. For instance, the wireless communication device 202 may sample and/or sweep for signals in varying frequency bands. If the wireless communication device 202 receives a signal (e.g., a synchronization signal) corresponding to a cell that is not in the current record, the wireless communication device 202 (e.g., processor 210) may determine that a new cell is detected. If the wireless communication device 202 does not receive a signal corresponding to a cell that is not in the current record, the wireless communication device 202 (e.g., processor 210) may determine that a new cell is not detected.

In some examples, the processor 210 may execute the skipping determination instructions 218 to determine whether to skip a subsequent measurement gap based on whether the appointed gain state matches the measured gain state and whether a new cell is detected. For instance, if the measured gain state does not match the appointed gain state or if a new cell is detected, the wireless communication device 202 may schedule (e.g., not skip) one or more subsequent measurement gaps. In some approaches, the processor 210 may execute the skipping determination instructions 218 to schedule one or more subsequent measurement gaps in response to determining that the measured gain state does not match the appointed gain state or that a new cell is detected. Scheduling a measurement gap may include scheduling a search, AGC performance, and/or measurement calculation for a subsequent measurement gap. In some examples, the processor 210 may perform measurement calculation during one or more measurement gaps. For instance, the processor 210 may utilize samples obtained during a measurement gap to perform measurement calculation in a subsequent measurement gap.

In some approaches, if the measured gain state matches the appointed gain state and if no new cell is detected, the wireless communication device 202 may skip one or more subsequent measurement gaps. For instance, the processor 210 may execute the skipping determination instructions 218 to skip one or more subsequent measurement gaps in response to determining that the measured gain state matches the appointed gain state and that a new cell is not detected. In some examples, the subsequent measurement gap may be a second measurement gap, and the processor 210 may execute the skipping determination instructions 218 to skip a third measurement gap in response to determining that the measured gain state matches the appointed gain state and that a new cell is not detected. For instance, the wireless communication device 202 may skip the second and third measurement gaps in some cases.

In some examples, the processor 210 may execute instructions to determine whether only an LTE-to-LTE measure ment is configured and whether a serving cell RSRP threshold is satisfied. For instance, the wireless communication device 202 (e.g., processor 210) may determine whether only one LTE-to-LTE target measurement object is configured (e.g., whether no other type of RAT target measurement besides LTE is configured and/or whether multiple RAT target measurements are not configured for mobility, ANR, and/or SON measurements). In some examples, the wireless communication device 202 may read a stored measurement configuration (e.g., a measurement configuration saved in memory 213) from a serving cell (e.g., base station 212). For instance, the stored measurement configuration may be read to determine whether there is one or more LTE-to-LTE and/or LTE-to-X RAT measurement objects. In some examples, the measurement configuration may be received at the wireless communication device 202 (e.g., UE) from the base station 212 (and/or network). In some cases, LTE-to-LTE measurement gaps may be enabled for ANR and/or SON measurement (e.g., not for wireless communication device 202 mobility purposes). In some of these cases, a slower measurement rate and/or delayed measurement may be tolerable when a serving cell signal is relatively strong. For example, the wireless communication device 202 (e.g., processor 210) may measure a serving cell RSRP based on a signal received from the base station 212. In some examples, a serving cell RSRP may be measured independent of and/or outside of the measurement gap(s) at periodic intervals. For instance, if a serving cell's RSRP is above a threshold and only one LTE-to-LTE measurement object is configured, the second measurement gap may be skipped.

In some examples, the processor 210 may execute instructions (e.g., skipping determination instructions 218) to reschedule a measurement calculation corresponding to a measurement gap (e.g., the first measurement gap) to a subsequent periodic measurement gap in response to determining that only the LTE-to-LTE measurement is configured and that the serving cell RSRP threshold is satisfied. For instance, if the serving cell RSRP is greater than the serving cell RSRP threshold (e.g., >−90 decibels relative to one milliwatt (dBm)), then a measurement calculation corresponding to the first measurement gap may be rescheduled to a subsequent (e.g., next) periodic measurement gap (e.g., may be rescheduled from a second measurement gap to a first measurement gap of a next set of measurement gaps). Examples of the RSRP threshold may include −95 dBm, −92 dBm, −90 dBm, −85 dBm, −75 dBm, etc.

In some examples, the processor 210 may execute instructions to determine whether the measured gain state is an overlapping gain state with the appointed gain state and whether an RSRP satisfies a threshold. An overlapping gain state may be a gain state that has an overlapping RSRP range with the appointed gain state. For example, part of an RSRP range of GS0 may overlap with part of an RSRP range of GS2. For a range of RSRP, for instance, a gain state (e.g., GS2) may be utilized to measure, even if the gain state (e.g., GS2) is not a target gain state (e.g., not an optimal gain state) for a corresponding cell power range. This may be utilized to enable skipping scheduling in some cases.

In some examples, the processor 210 may execute instructions (e.g., skipping determination instructions 218) to skip a subsequent measurement gap in response to determining that the measured gain state is an overlapping gain state, that the RSRP satisfies a threshold, and that no new cell is detected. In some examples, the subsequent measurement gap may be a second measurement gap, and the processor 210 may execute instructions to skip scheduling a third measurement gap in response to determining that the mea sured gain state is an overlapping gain state, that the RSRP satisfies a threshold, and that no new cell is detected. For instance, if the appointed gain state is GS2 and the measured gain state is GS0, if the RSRP satisfies a threshold (e.g., if the RSRP measured in the first measurement gap is >−105 dBm and/or if the RSRP measured in the first measurement gap is <−55 dBm), and no new cell is detected in the first measurement gap or the second measurement gap, then sampling for a second measurement gap may be skipped and/or scheduling for a third measurement gap may be skipped. Examples of the threshold(s) may include −110 dBm, −105 dBm, −103 dBm, −98 dBm, −65 dBm, −60 dBm, −55 dBm, −50 dBm, −105 dBm<RSRP<−55 dBm, and/or one or more other value(s), etc.

Figure 3:
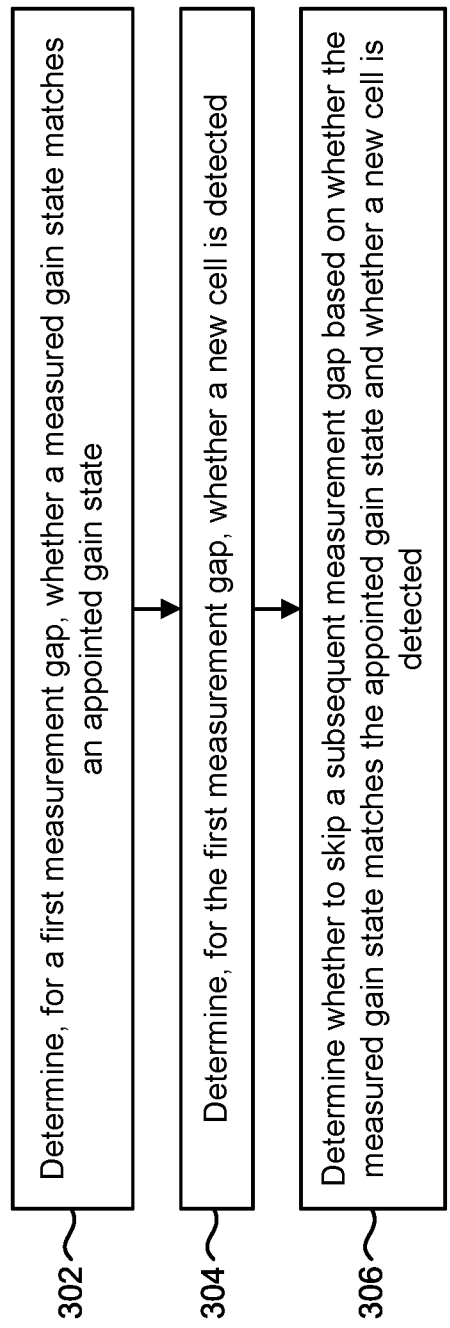
FIG. 3 is a flow diagram illustrating an example of a method for measurement gap management.

FIG. 3 is a flow diagram illustrating an example of a method 300 for measurement gap management. In some examples, the method 300 is performed by a wireless communication device (e.g., the wireless communication device 202 described in relation to FIG. 2).

A wireless communication device may determine 302, for a first measurement gap, whether a measured gain state matches an appointed gain state. In some examples, determining 302 whether the measured gain state matches an appointed gain state may be performed as described in relation to FIG. 2.

The wireless communication device may determine 304, for the first measurement gap, whether a new cell is detected. In some examples, determining 304 whether a new cell is detected may be performed as described in relation to FIG. 2.

The wireless communication device may determine 306 whether to skip a subsequent measurement gap based on whether the measured gain state matches the appointed gain state and whether a new cell is detected. In some examples, determining 306 whether to skip a subsequent measurement gap may be performed as described in relation to FIG. 2. For instance, the wireless communication device may skip the subsequent measurement gap in response to determining that the measured gain state matches the appointed gain state and that a new cell is not detected.

Figure 4:
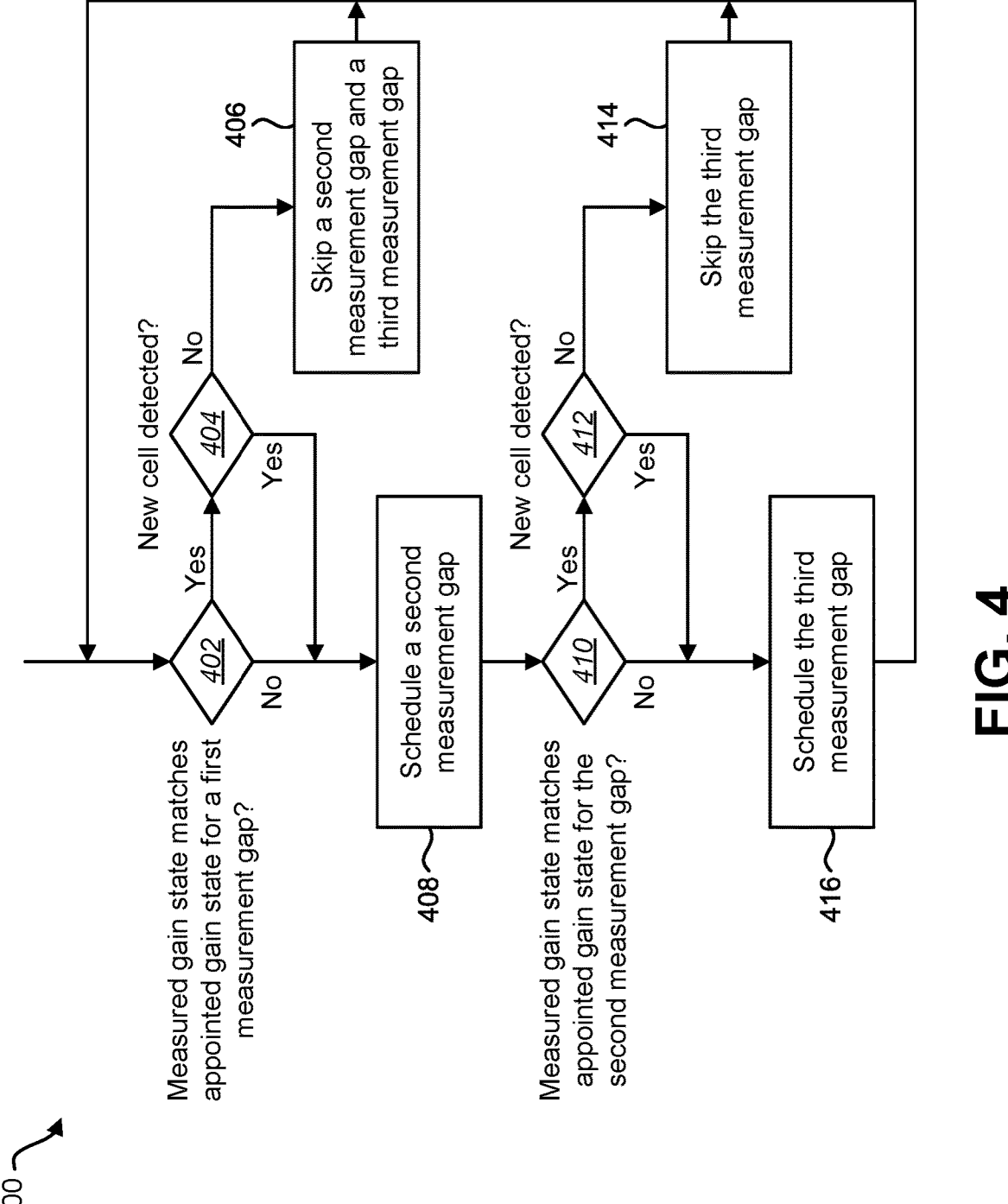
FIG. 4 is a flow diagram illustrating another example of a method for measurement gap management.

FIG. 4 is a flow diagram illustrating another example of a method 400 for measurement gap management. In some examples, the method 400 is performed by a wireless communication device (e.g., the wireless communication device 202 described in relation to FIG. 2).

A wireless communication device may determine 402 whether a measured gain state matches an appointed gain state for a first measurement gap. In some examples, determining 402 whether the measured gain state matches the appointed gain state (e.g., GS2) may be performed as described in relation to FIG. 2.

In a case that the measured gain state matches the appointed gain state, the wireless communication device may determine 404 whether a new cell is detected. In some examples, determining 404 whether a new cell is detected may be performed as described in relation to FIG. 2.

In a case that a new cell is not detected (e.g., no new cell is detected), the wireless communication device may skip 406 a second measurement gap and a third measurement gap. In some examples, skipping 406 the second measurement gap and the third measurement gap may be performed as described in relation to FIG. 2. For instance, in the first measurement gap, if the measured gain state (e.g., measured AGC state for an LNA) matches the appointed gain state (e.g., an appointed AGC gain state, GS2, etc.) and no new cell is detected, then the wireless communication device may skip 406 the second measurement gap and the third measurement gap. For instance, the wireless communication device may not perform AGC, search, and/or measurement calculation corresponding to the second measurement gap and the third measurement gap. In some approaches, skipping a measurement gap may include entering a sleep and/or non-reception state during the measurement gap. In some examples, operation may return to determining 402 whether the measured gain state matches an appointed gain state for a first measurement gap (e.g., a subsequent and/or periodic first measurement gap).

In a case that the measured gain state does not match the appointed gain state or that a new cell is detected, the wireless communication device may schedule 408 a second measurement gap. For instance, the wireless communication device may schedule performing AGC, search, and/or measurement calculation for the second measurement gap (e.g., a measurement gap after the first measurement gap).

The wireless communication device may determine 410 whether a measured gain state matches an appointed gain state for the second measurement gap. In some examples, the appointed gain state for the second measurement gap may be different from the appointed gain state for the first measurement gap. For instance, the appointed gain state may switch for different measurement gaps. In some examples, gain state (e.g., AGC gain state) may be dependent on RSSI. In some cases, signal fluctuations and/or device movements may cause a switch in gain state (e.g., may cause the AGC to switch). In some examples, determining 410 whether the measured gain state matches the appointed gain state may be performed as described in relation to FIG. 2.

In a case that the measured gain state matches the appointed gain state, the wireless communication device may determine 412 whether a new cell is detected (for the second measurement gap, for instance). In some examples, determining 412 whether a new cell is detected may be performed as described in relation to FIG. 2.

In a case that a new cell is not detected (e.g., no new cell is detected), the wireless communication device may skip 414 the third measurement gap. In some examples, skipping 414 the third measurement gap may be performed as described in relation to FIG. 2. For instance, in the second measurement gap, if the measured gain state (e.g., measured AGC state for an LNA) matches the appointed gain state (e.g., an appointed AGC gain state, etc.) and no new cell is detected in the second measurement gap (and no new cell was detected in the first measurement gap, for instance), then the wireless communication device may skip 414 the third measurement gap. For instance, the wireless communication device may not perform AGC, search, and/or measurement calculation corresponding to the third measurement gap. In some examples, operation may return to determining 402 whether the measured gain state matches an appointed gain state for a first measurement gap (e.g., a subsequent and/or periodic first measurement gap).

In a case that the measured gain state does not match the appointed gain state or that a new cell is detected, the wireless communication device may schedule 416 the third measurement gap. For instance, the wireless communication device may schedule performing AGC, search, and/or measurement calculation for the third measurement gap (e.g., a measurement gap after the first measurement gap and the second measurement gap). In some examples, operation may return to determining 402 whether the measured gain state matches an appointed gain state for a first measurement gap (e.g., a subsequent and/or periodic first measurement gap).

Figure 5:
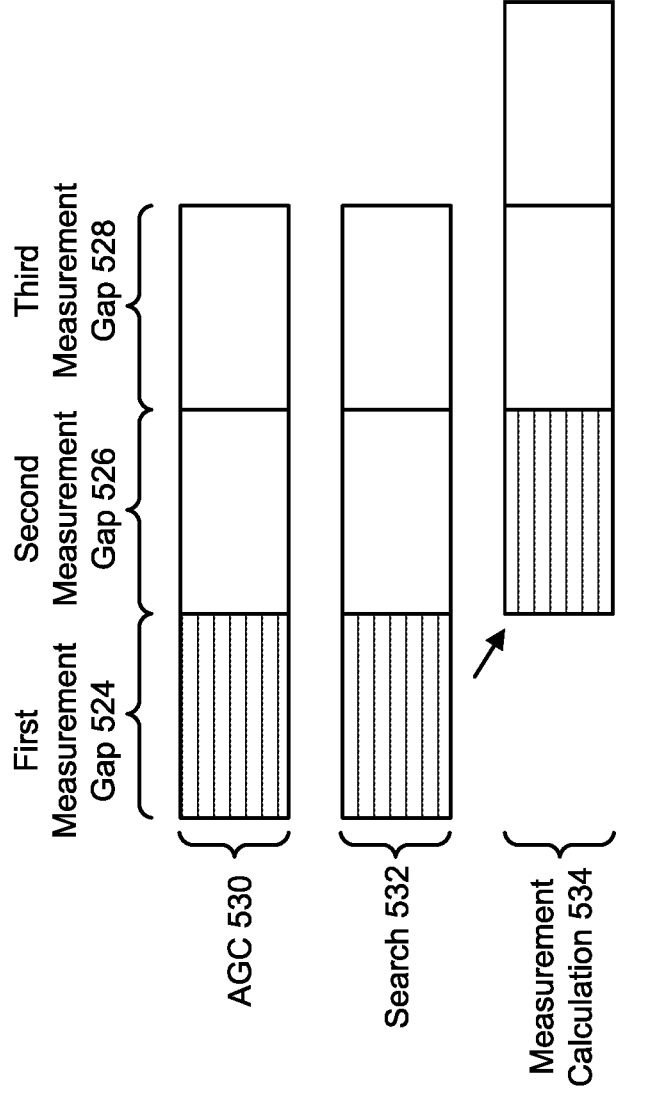
FIG. 5 is a diagram illustrating an example of measurement gap skipping in accordance with some examples of the techniques described herein.

FIG. 5 is a diagram illustrating an example of measurement gap skipping in accordance with some examples of the techniques described herein. In particular, FIG. 5 illustrates a first measurement gap 524, a second measurement gap 526, and a third measurement gap 528. In this example, a wireless communication device (e.g., the wireless communication device 202 described in relation to FIG. 2) performs AGC 530, search 532, and measurement calculation 534 for the first measurement gap 524. For instance, the AGC 530 performed in the first measurement gap 524 may be utilized to determine that a measured gain state matches an appointed gain state. The search 532 performed in the first measurement gap 524 may be utilized to determine that no new cell is detected. As can be observed in FIG. 5, the measurement calculation for the first measurement gap 524 may be performed after the first measurement gap 524 (e.g., during the second measurement gap 526). For instance, samples collected for AGC 530 and/or search 532 during the first measurement gap 524 may be utilized to perform measurement calculation 534 during the second measurement gap 526.

In the example of FIG. 5, the wireless communication device skips performing AGC 530, search 532, and measurement calculation 534 for the second measurement gap 526 and for the third measurement gap 528. For instance, AGC 530 and search 532 may not be performed during the second measurement gap 526 and the third measurement gap 528. Measurement calculation 534 may not be performed for the second measurement gap 526 and for the third measurement gap 528.

Figure 6:
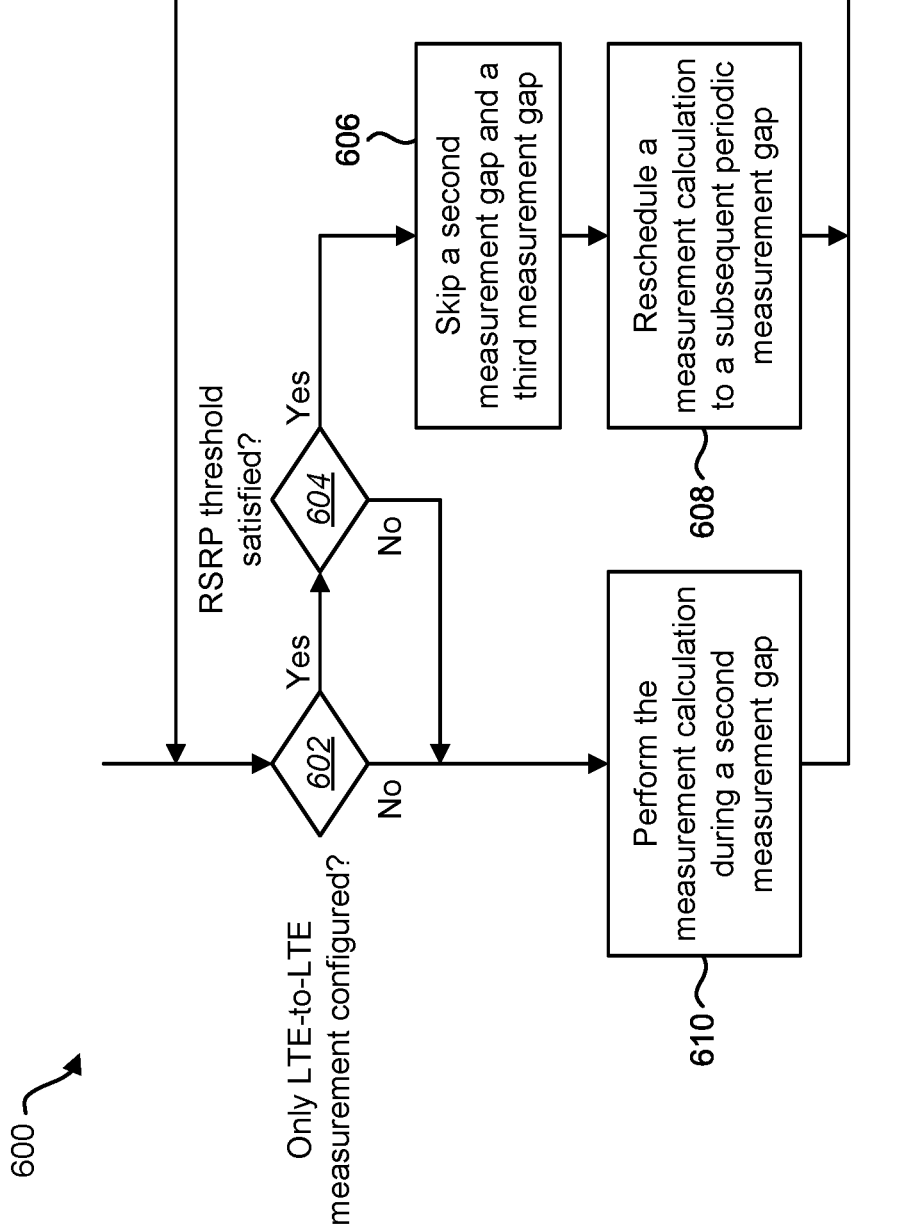
FIG. 6 is a flow diagram illustrating another example of a method for measurement gap management.

FIG. 6 is a flow diagram illustrating another example of a method 600 for measurement gap management. In some examples, the method 600 is performed by a wireless communication device (e.g., the wireless communication device 202 described in relation to FIG. 2).

A wireless communication device may determine 602 whether only an LTE-to-LTE measurement is configured. In some examples, determining 602 whether only an LTE-to-LTE measurement is configured may be performed as described in relation to FIG. 2. For instance, the wireless communication device may determine whether only one LTE-to-LTE target measurement object is configured.

In a case that only LTE-to-LTE measurement is configured, the wireless communication device may determine 604 whether an RSRP threshold is satisfied. In some examples, determining 604 whether an RSRP threshold is satisfied may be performed as described in relation to FIG. 2. For instance, the wireless communication device may determine if a serving cell RSRP is greater than an RSRP threshold (e.g., serving cell RSRP>−90 dBm).

In a case that the RSRP threshold is satisfied, the wireless communication device may skip 606 a second measurement gap and a third measurement gap. In some examples, skipping 606 the second measurement gap and the third measurement gap may be performed as described in relation to FIG. 2. In some approaches, measurement calculation for the first measurement gap may also be skipped. For instance, the measurement calculation for the first measurement gap may not be performed during the second measurement gap. For instance, if only one LTE-to-LTE target measurement object is configured and if the serving cell RSRP satisfies the RSRP threshold (e.g., >−90 dBm), then the wireless communication device may skip 606 the second measurement gap and the third measurement gap and may skip measurement calculation for the first measurement gap. For instance, the wireless communication device may not perform AGC, search, and/or measurement calculation corresponding to the second measurement gap and the third measurement gap and may skip measurement calculation for the first measurement gap during the second measurement gap.

The wireless communication device may reschedule 608 a measurement calculation to a subsequent periodic measurement gap. In some examples, rescheduling 608 the measurement calculation may be performed as described in relation to FIG. 2. For instance, wireless communication device may reschedule the measurement calculation for the first measurement gap to a next first measurement gap (e.g., next AGC and/or search to the next first measurement gap). In some approaches, this may result in only one measurement calculation per search and/or stream. In some examples, operation may return to determining 602 whether only LTE-to-LTE measurement is configured for a first measurement gap (e.g., a subsequent and/or periodic first measurement gap).

In a case that only LTE-to-LTE measurement is not configured or that the RSRP threshold is not satisfied, the wireless communication device may perform 610 the measurement calculation during a second measurement gap. In some examples, performing 610 the measurement calculation during the second measurement gap may be performed as described in relation to FIG. 2. For instance, the wireless communication device may perform the measurement calculation corresponding to the first measurement gap (e.g., perform the measurement calculation using samples from the first measurement gap during the second measurement gap). In some examples, operation may return to determining 602 whether only LTE-to-LTE measurement is configured.

Figure 7:
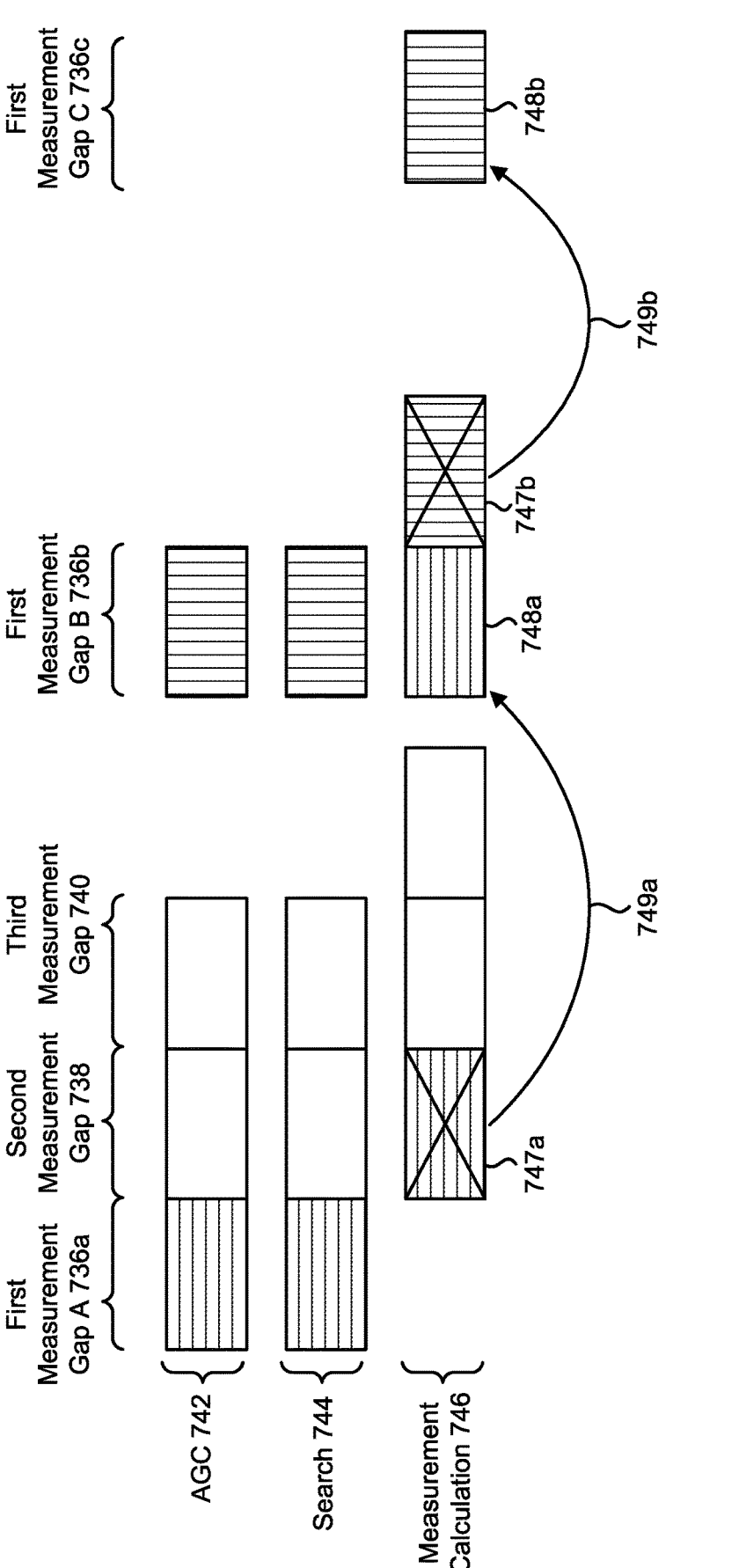
FIG. 7 is a diagram illustrating another example of measurement gap skipping in accordance with some examples of the techniques described herein.

FIG. 7 is a diagram illustrating another example of measurement gap skipping in accordance with some examples of the techniques described herein. In particular, FIG. 7 illustrates first measurement gap A 736a, a second measurement gap 738, a third measurement gap 740, first measurement gap B 736b, and first measurement gap C 736c. In this example, a wireless communication device (e.g., the wireless communication device 202 described in relation to FIG. 2) performs AGC 742 and search 744 for first measurement gap A 736a.

The wireless communication device may determine that only one LTE-to-LTE measurement is configured and that a serving cell RSRP satisfies an RSRP threshold. As can be observed in FIG. 7, measurement calculation for first measurement gap A 736a may be skipped 747a during the second measurement gap 738. Measurement calculation A 748a may be rescheduled 749a (e.g., delayed, postponed, etc.) to be performed during first measurement gap B 736b, which may be a subsequent (e.g., next) periodic measurement gap (after first measurement gap A 736a, the second measurement gap 738, and/or the third measurement gap 740). For instance, samples collected for AGC 742 and/or search 744 during first measurement gap A 736a may be utilized to perform measurement calculation A 748a during first measurement gap B 736b. Similarly, measurement calculation B 748b corresponding to the AGC 742 and search 744 performed during first measurement gap B 736b may be skipped 747b and rescheduled 749b to first measurement gap C 736c (e.g., a subsequent periodic measurement gap). In some examples, skipping and rescheduling may be utilized to avoid performing AGC, search, and/or measurement calculation during one or more measurement gaps (e.g., the second measurement gap 738 and the third measurement gap 740). For instance, a wireless communication device may enter and/or maintain a sleep state during one or more measurement gaps (e.g., the second measurement gap 738 and the third measurement gap 740).

Figure 8:
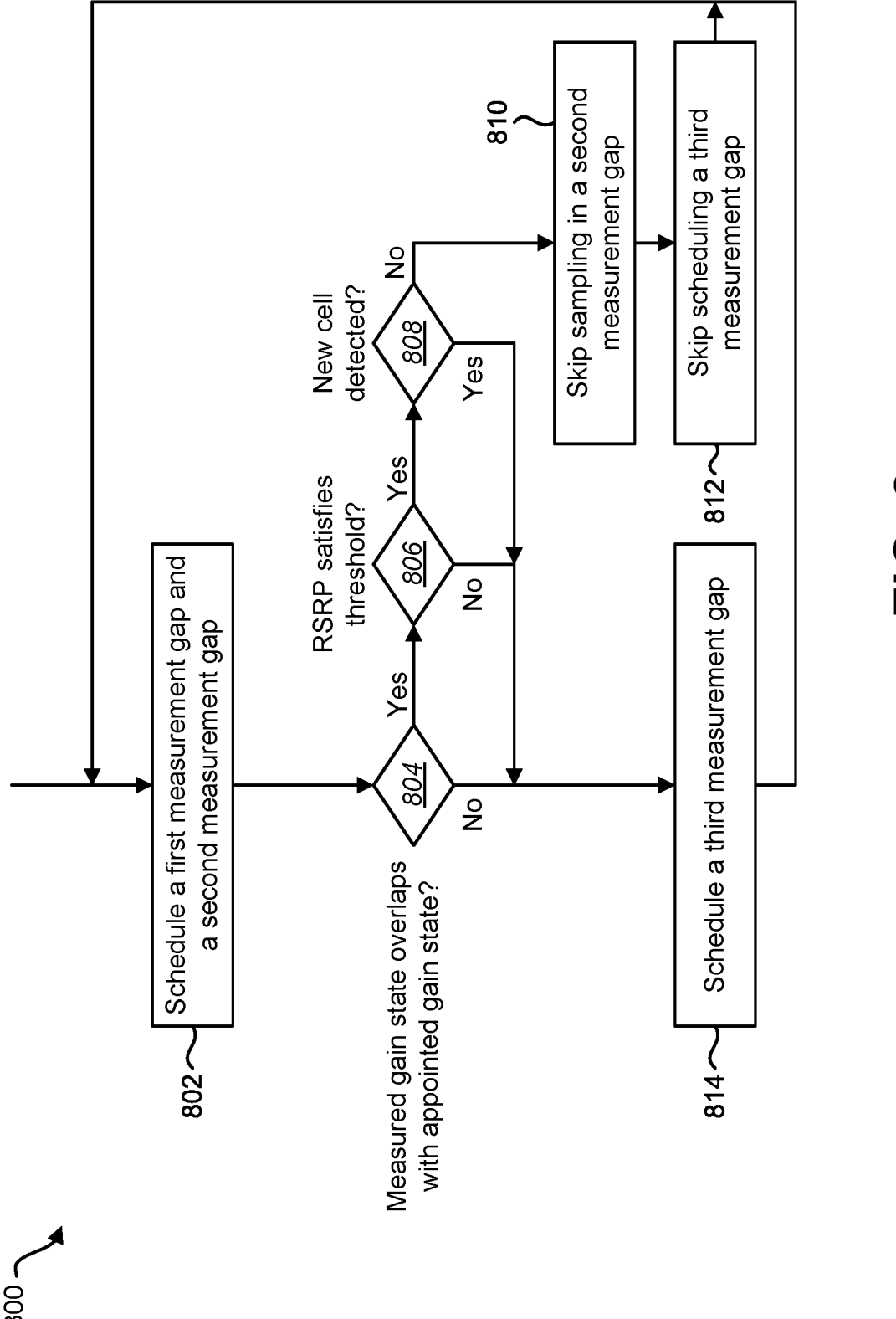
FIG. 8 is a flow diagram illustrating another example of a method for measurement gap management.

FIG. 8 is a flow diagram illustrating another example of a method 800 for measurement gap management. In some examples, the method 800 is performed by a wireless communication device (e.g., the wireless communication device 202 described in relation to FIG. 2).

A wireless communication device may schedule 802 a first measurement gap and a second measurement gap. For example, the wireless communication device may schedule AGC performance and search performance for a first measurement gap and a second measurement gap.

The wireless communication device may determine 804 whether a measured gain state overlaps with an appointed gain state. For instance, the wireless communication device may determine 804 whether a measured gain state overlaps with an appointed gain state in terms of applicable RSRP range (e.g., whether the applicable RSRP range of a measured gain state overlaps with that of an appointed gain state). In some examples, determining 804 whether a measured gain state overlaps with an appointed gain state may be performed as described in relation to FIG. 2. For instance, the wireless communication device may determine whether the measured gain state has an overlapping RSRP range with the appointed gain state. In some approaches, the wireless communication device may compare RSRP ranges. In some approaches, the wireless communication device may utilize a look-up table or other function to determine whether the measured gain state (e.g., GS0) maps to the appointed gain state (e.g., GS2) as overlapping. In some examples, determining 804 whether a measured gain state overlaps with an appointed gain state may be performed with and/or in response to a gain state matching determination (as described in relation to FIG. 3 and/or FIG. 4, for example). For instance, the wireless communication device may determine 804 whether the measured gain state's RSRP range overlaps with that of an appointed gain state in response to determining that a measured gain state does not match an appointed gain state.

In a case that the measured gain state's RSRP range overlaps with that of the appointed gain state, the wireless communication device may determine 806 whether an RSRP satisfies a threshold. In some examples, determining 806 whether the RSRP satisfies a threshold may be performed as described in relation to FIG. 2. For instance, the wireless communication device may determine if an RSRP measured in the first measurement gap is greater than a threshold, is less than a threshold, and/or is within a threshold range (e.g., RSRP>−105 dBm and/or RSRP<−55 dBm). In some examples, the threshold range may be the overlapping range (and/or may be within the overlapping range, for instance) between the measured gain state and the appointed gain state. For instance, the wireless communication device may determine if a measured gain state (e.g., AGC) at a gap start of the first measurement gap is applicable to the RSRP of (e.g., measured with) an appointed gain state (e.g., LNA for GS2).

In a case that the RSRP satisfies the threshold, the wireless communication device may determine 808 whether a new cell is detected. In some examples, determining 808 whether a new cell is detected may be performed as described in relation to FIG. 1.

In a case that a new cell is not detected (e.g., no new cell is detected), the wireless communication device may skip 810 sampling in a second measurement gap. In some examples, skipping 810 sampling in the second measurement gap may be performed as described in relation to FIG.

2. For instance, the wireless communication device may skip performing the scheduled AGC and/or search in the second measurement gap.

The wireless communication device may skip 812 scheduling a third measurement gap. In some examples, skipping 812 scheduling a third measurement gap may be performed as described in relation to FIG. 2. For instance, the wireless communication device may not schedule performing AGC and/or search in the third measurement gap. For instance, if the measured gain state overlaps with an appointed gain state, if the RSRP satisfies one or more thresholds, and if no new cell is detected, the wireless communication device may skip 810 sampling in the second measurement gap and may skip 812 scheduling the third measurement gap. In some examples, operation may return to scheduling 802 a first measurement gap and a second measurement gap (for a subsequent set of measurement gaps, for instance).

In a case that the measured gain state does not overlap with the appointed gain state, that the RSRP does not satisfy a threshold, or that a new cell is detected, the wireless communication device may schedule 814 a third measurement gap. For instance, the wireless communication device may schedule AGC performance and search performance for the third measurement gap. In some examples, operation may return to scheduling 802 a first measurement gap and a second measurement gap (for a subsequent set of measurement gaps, for instance).

One or more of the methods 300, 400, 600, 800 described herein and/or one or more of the functions, operations, and/or procedures thereof may be combined in some examples. For instance, the methods and/or functions thereof may be performed together (e.g., concurrently) and/or as parts of a procedure. In some examples, one or more of the methods and/or functions thereof may be performed based on the same and/or different sets of measurement gaps. For instance, one method may be performed for one set of measurement gaps and another method may be performed for another (e.g., subsequent) set of measurement gaps.

Figure 9:
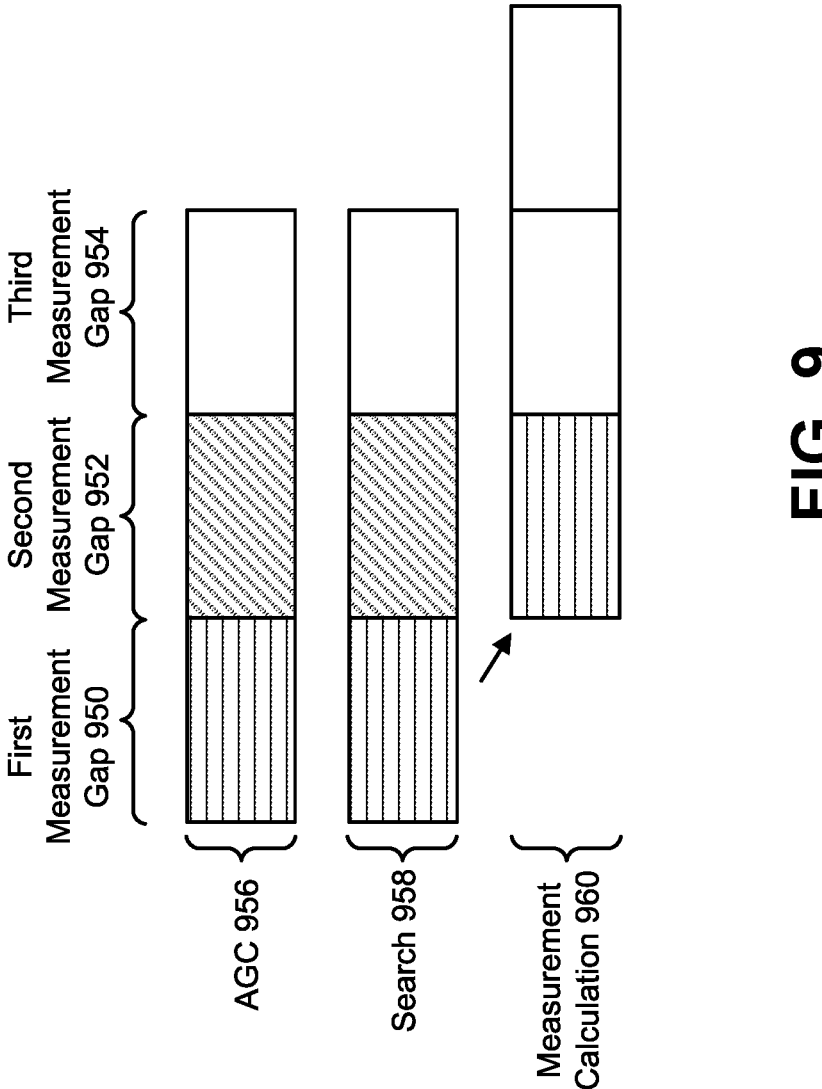
FIG. 9 is a diagram illustrating another example of measurement gap skipping in accordance with some examples of the techniques described herein.

FIG. 9 is a diagram illustrating another example of measurement gap skipping in accordance with some examples of the techniques described herein. In particular, FIG. 9 illustrates a first measurement gap 950, a second measurement gap 952, and a third measurement gap 954. In this example, a wireless communication device (e.g., the wireless communication device 202 described in relation to FIG. 2) schedules AGC 956, search 958, and/or measurement calculation 960 for the first measurement gap 950 and second measurement gap 952.

The wireless communication device may determine that a measured gain state overlaps with an appointed gain state, may determine that an RSRP measured for the first measurement gap 950 satisfies a threshold, and that no new cell is detected for the first measurement gap 950 and/or the second measurement gap 952. In this case, the wireless communication device may skip sampling in the second measurement gap 952 and/or may skip scheduling the third measurement gap 954. In another case (e.g., if the measured gain state does not overlap with the appointed gain state, if the RSRP does not satisfy a threshold, or if a new cell is detected), the third measurement gap 954 may be scheduled.

Figure 10:
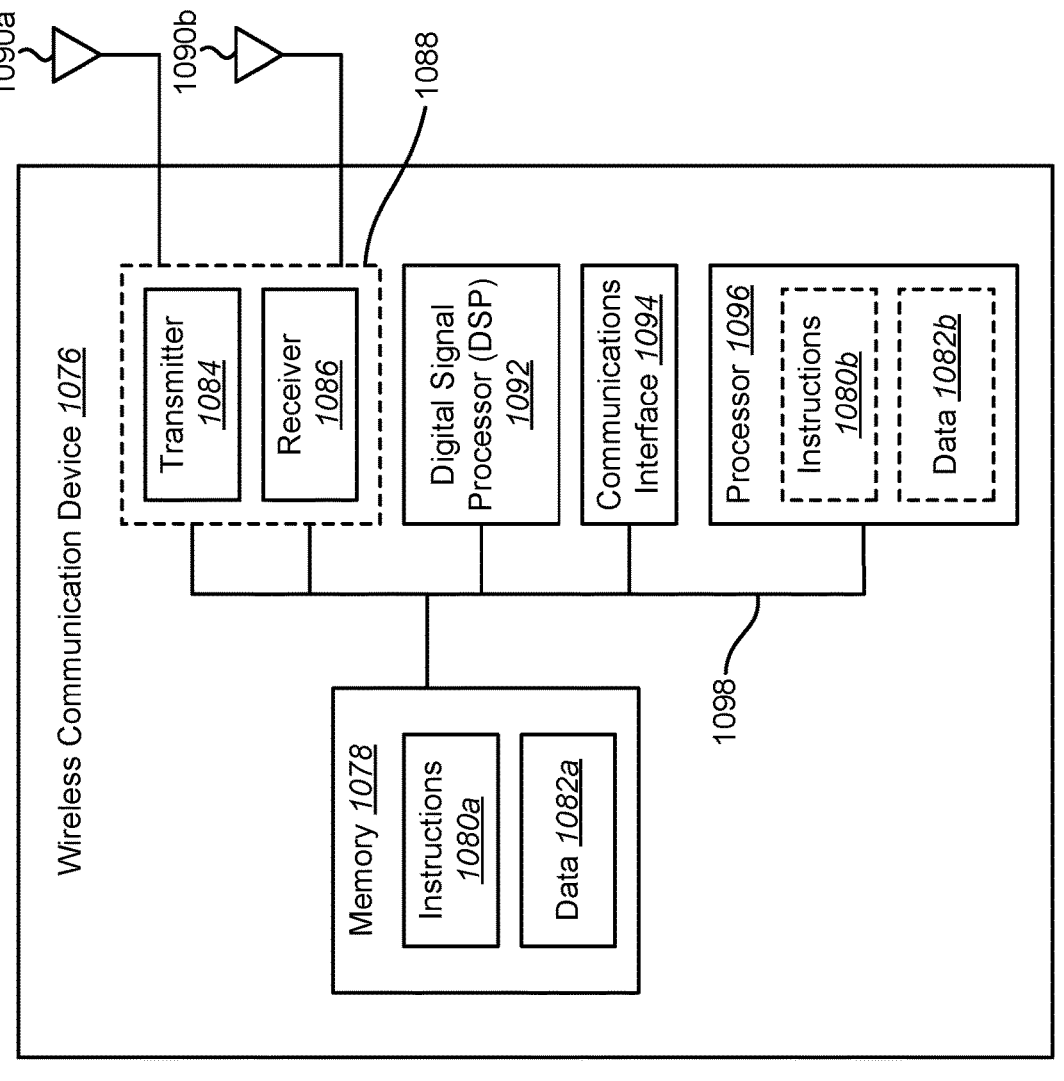
FIG. 10 illustrates certain components that may be included within a wireless communication device configured to implement various examples of the techniques for measurement gap management described herein.

FIG. 10 illustrates certain components that may be included within a wireless communication device 1076 configured to implement various examples of the techniques for measurement gap management described herein. The wireless communication device 1076 may be an access terminal, a mobile station, a user equipment (UE), a smartphone, a digital camera, a video camera, a tablet device, a laptop computer, a desktop computer, an Internet of Things (IoT) device, a telematics device, a base station, an access point, a vehicle, a drone, etc. The wireless communication device 1076 may be implemented in accordance with one or more of the wireless communication devices (e.g., wireless communication device(s) 102, 202) described herein.

The wireless communication device 1076 includes a processor 1096. The processor 1096 may be a general purpose single- or multi-chip microprocessor (e.g., an ARM), a special purpose microprocessor (e.g., a digital signal processor (DSP)), a microcontroller, a programmable gate array, etc. The processor 1096 may be referred to as a central processing unit (CPU) and/or a modem processor. Although a single processor 1096 is shown in the wireless communication device 1076, in an alternative configuration, a combination of processors (e.g., an ARM and DSP) could be implemented.

The wireless communication device 1076 also includes memory 1078. The memory 1078 may be any electronic component capable of storing electronic information. The memory 1078 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof.

Data 1082a and instructions 1080a may be stored in the memory 1078. The instructions 1080a may be executable by the processor 1096 to implement one or more of the methods described herein. Executing the instructions 1080a may involve the use of the data 1082a that is stored in the memory 1078. When the processor 1096 executes the instructions 1080, various portions of the instructions 1080b may be loaded onto the processor 1096 and/or various pieces of data 1082b may be loaded onto the processor 1096. In some examples, the instructions 1080 may be executable to implement and/or perform one or more of the methods 300, 400, 600, 800, and/or one or more of the functions, procedures, and/or operations described herein.

The wireless communication device 1076 may also include a transmitter 1084 and a receiver 1086 to allow transmission and reception of signals to and from the wireless communication device 1076. The transmitter 1084 and receiver 1086 may be collectively referred to as a transceiver 1088. One or more antennas 1090a—b may be electrically coupled to the transceiver 1088. The wireless communication device 1076 may also include (not shown) multiple transmitters, multiple receivers, multiple transceivers, and/or additional antennas.

The wireless communication device 1076 may include a digital signal processor (DSP) 1092. The wireless communication device 1076 may also include a communications interface 1094. The communications interface 1094 may allow and/or enable one or more kinds of input and/or output. For example, the communications interface 1094 may include one or more ports and/or communication devices for linking other devices to the wireless communication device 1076. In some examples, the communications interface 1094 may include the transmitter 1084, the receiver 1086, or both (e.g., the transceiver 1088). Additionally or alternatively, the communications interface 1094 may include one or more other interfaces (e.g., touchscreen, keypad, keyboard, microphone, camera, etc.). For example, the communication interface 1094 may enable a user to interact with the wireless communication device 1076.

The various components of the wireless communication device 1076 may be coupled together by one or more buses, which may include a power bus, a control signal bus, a status signal bus, a data bus, etc. For the sake of clarity, the various buses are illustrated in FIG. 10 as a bus system 1098.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not necessarily mean "based only on." In other words, the phrase "based on" may describe "based only on" and/or "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, compact disc read-only memory (CD-ROM) or other optical disk storage, magnetic disk storage or other magnetic storage devices, or any other medium that can be used to carry or store program code in the form of instructions and/or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. A computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the this disclosure. In other words, unless a specific order of steps or actions is required for proper operation of the method that is being described, the order and/or use of specific steps and/or actions may be modified without departing from the scope of this disclosure.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" may mean one or more items. For example, the phrase "A, B, and/or C" may mean any of: only A, only B, only C, A and B (but not C), B and C (but not A), A and C (but not B), or all of A, B, and C. As used herein, the phrase "at least one of" may mean one or more items. For example, the phrase "at least one of A, B, and C" or the phrase "at least one of A, B, or C" may mean any of: only A, only B, only C, A and B (but not C), B and C (but not A), A and C (but not B), or all of A, B, and C. As used herein, the phrase "one or more of" may mean one or more items. For example, the phrase "one or more of A, B, and C" or the phrase "one or more of A, B, or C" may mean any of: only A, only B, only C, A and B (but not C), B and C (but not A), A and C (but not B), or all of A, B, and C.

It is to be understood that the appended additional embodiments of this disclosure are not limited to the precise configuration and components illustrated above. Various modifications, changes, and variations may be made in the arrangement, operation, and details of the systems, methods, and apparatus described herein without departing from the scope of the appended additional embodiments of this disclosure. For example, one or more of the operations, functions, elements, aspects, etc., described herein may be omitted or combined.

What is claimed is:

1. A method, comprising:
  determining, for a first measurement gap, whether a measured gain state matches an appointed gain state;
  determining, for the first measurement gap, whether a new cell is detected; and
  determining whether to skip a subsequent measurement gap based on whether the measured gain state matches the appointed gain state and whether a new cell is detected.

2. The method of claim 1, further comprising scheduling the subsequent measurement gap in response to determining that the measured gain state does not match the appointed gain state or that a new cell is detected.

3. The method of claim 1, further comprising skipping the subsequent measurement gap in response to determining that the measured gain state matches the appointed gain state and that a new cell is not detected.

4. The method of claim 1, wherein the subsequent measurement gap is a second measurement gap, and wherein the method further comprises skipping a third measurement gap in response to determining that the measured gain state matches the appointed gain state and that a new cell is not detected.

5. The method of claim 1, further comprising determining whether only a Long-Term Evolution (LTE)-to-LTE measurement is configured and whether a serving cell reference signal received power (RSRP) threshold is satisfied.

6. The method of claim 5, further comprising rescheduling a measurement calculation corresponding to the first measurement gap to a subsequent periodic measurement gap in response to determining that only the LTE-to-LTE measurement is configured and that the serving cell RSRP threshold is satisfied.

7. The method of claim 1, further comprising determining whether the measured gain state is an overlapping gain state with the appointed gain state and whether a reference signal received power (RSRP) satisfies a threshold.

8. The method of claim 7, further comprising skipping the subsequent measurement gap in response to determining that the measured gain state is an overlapping gain state, that the RSRP satisfies the threshold, and that no new cell is detected.

9. The method of claim 8, wherein the subsequent measurement gap is a second measurement gap, and wherein the method further comprises skipping scheduling a third measurement gap in response to determining that the measured gain state is an overlapping gain state, that the RSRP satisfies the threshold, and that no new cell is detected.

10. The apparatus of claim 7, wherein the one or more processors are further configured to execute the computer-executable instructions and cause the apparatus to skip the subsequent measurement gap in response to determining that the measured gain state is an overlapping gain state, that the RSRP satisfies the threshold, and that no new cell is detected.

11. The method of any preceding claim 1, wherein multiple channels are configured for measurement.

12. An apparatus, comprising at least one memory comprising computer-executable instructions; and one or more processors configured to execute the computer-executable instructions and cause the apparatus to:
  determine, for a first measurement gap, whether a measured gain state matches an appointed gain state;
  determine, for the first measurement gap, whether a new cell is detected; and determine whether to skip a subsequent measurement gap based on whether the measured gain state matches the appointed gain state and whether a new cell is detected.

13. The apparatus of claim 12, wherein the one or more processors are further configured to execute the computer-executable instructions and cause the apparatus to schedule the subsequent measurement gap in response to determining that the measured gain state does not match the appointed gain state or that a new cell is detected.

14. The apparatus of claim 12, wherein the one or more processors are further configured to execute the computer-executable instructions and cause the apparatus to skip the subsequent measurement gap in response to determining that the measured gain state matches the appointed gain state and that a new cell is not detected.

15. The apparatus of claim 12, wherein the subsequent measurement gap is a second measurement gap, and wherein the method further comprises skipping a third measurement gap in response to determining that the measured gain state matches the appointed gain state and that a new cell is not detected.

16. The apparatus of claim 12, wherein the one or more processors are further configured to execute the computer-executable instructions and cause the apparatus to determine whether only a Long-Term Evolution (LTE)-to-LTE measurement is configured and whether a serving cell reference signal received power (RSRP) threshold is satisfied.

17. The apparatus of claim 1, wherein the one or more processors are further configured to execute the computer-executable instructions and cause the apparatus to reschedule a measurement calculation corresponding to the first measurement gap to a subsequent periodic measurement gap in response to determining that only the LTE-to-LTE measurement is configured and that the serving cell RSRP threshold is satisfied.

18. The apparatus of claim 12, wherein the one or more processors are further configured to execute the computer-executable instructions and cause the apparatus to determine whether the measured gain state is an overlapping gain state with the appointed gain state and whether a reference signal received power (RSRP) satisfies a threshold.

19. The apparatus of claim 12, wherein multiple channels are configured for measurement.

20. A non-transitory computer-readable medium comprising executable instructions that, when executed by a processor of an apparatus, cause the apparatus to:

determine, for a first measurement gap, whether a measured gain state matches an appointed gain state;

determine, for the first measurement gap, whether a new cell is detected; and determine whether to skip a subsequent measurement gap based on whether the measured gain state matches the appointed gain state and whether a new cell is detected.

* * * * *